United States Patent Office 3,560,056
Patented Feb. 2, 1971

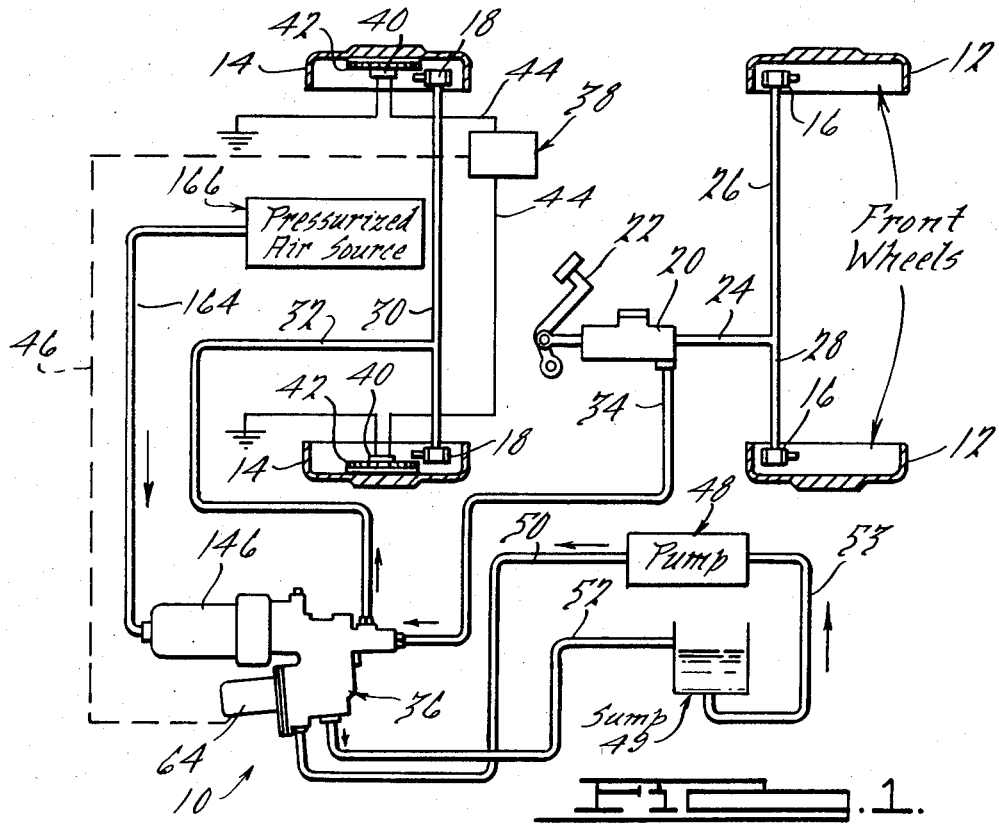
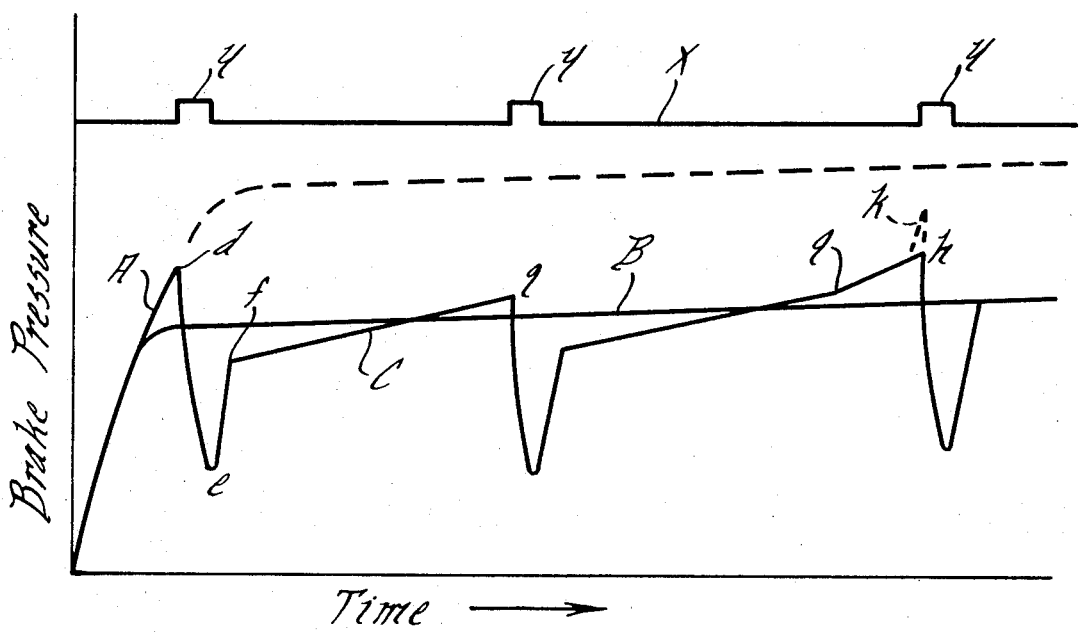

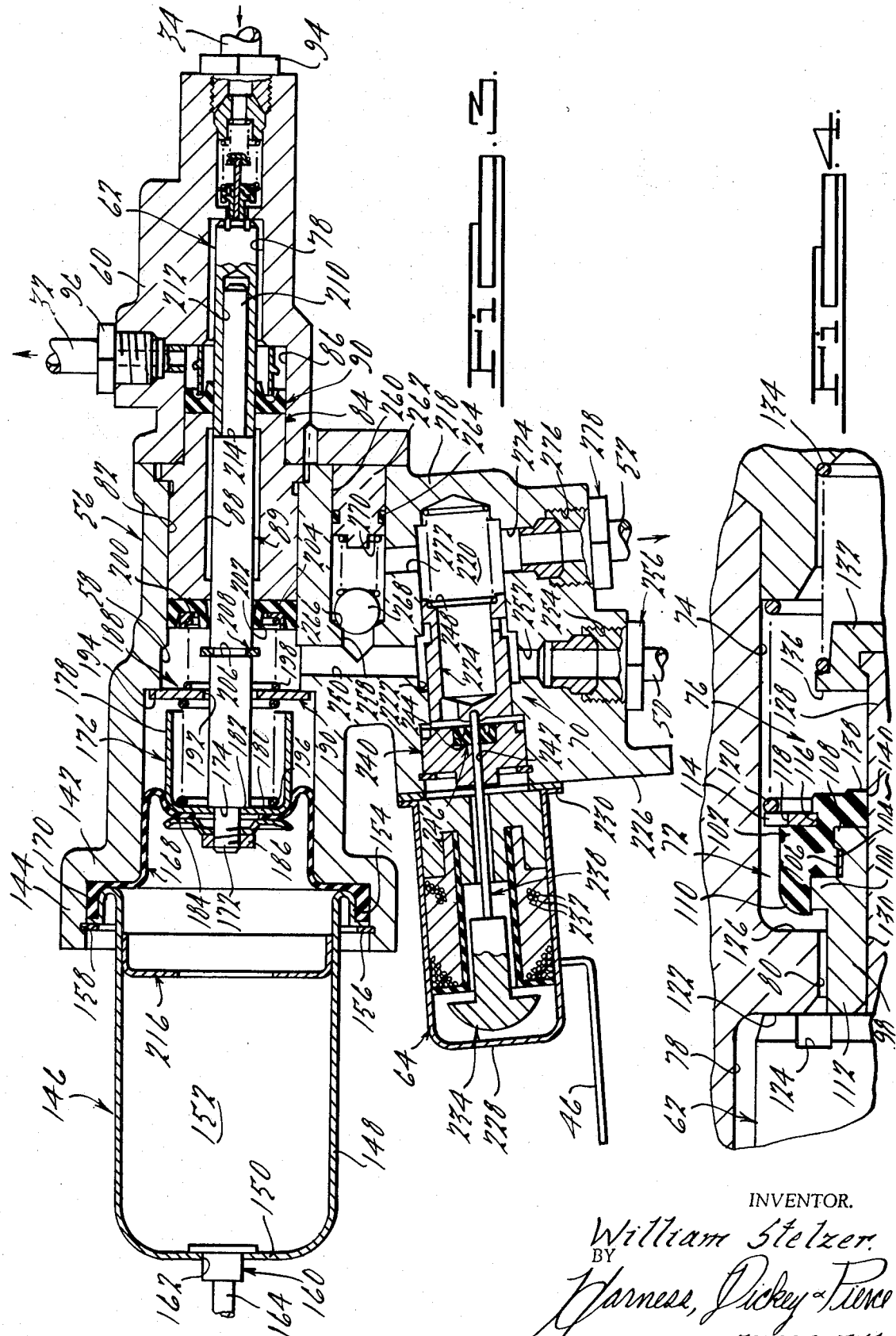

3,560,056
SKID CONTROL SYSTEM
William Stelzer, Milford, Mich., assignor to Kelsey-Hayes Company, Romulus, Mich., a corporation of Delaware
Filed Dec. 16, 1968, Ser. No. 783,794
Int. Cl. B60t 8/08
U.S. Cl. 303—21
23 Claims

ABSTRACT OF THE DISCLOSURE

A skid control system adapted for operative association with the fluid actuated braking system of an automotive or similar type vehicle; the system including a modulating valve assembly for selectively controlling the flow or supply of hydraulic brake actuating fluid between the master brake cylinder of the vehicle and one or more of the wheel cylinders thereof; the modulating valve including a pressurized cylinder and being operable in response to and actuatable by an increase in fluid pressure from a source thereof ancillary to the hydraulic brake system.

BACKGROUND OF THE INVENTION

Under certain road conditions, application of maximum braking pressure, and frequently less than maximum pressure of automobile and similar type vehicular braking systems, results in skidding and a locked-in wheel and/or skid condition. It is, of course, well established that if the wheels of a vehicle are locked or are skidding excessively, the coefficient of friction between the vehicle wheels and the surface of the road over which the vehicle is traveling can decrease, and the effectiveness of the vehicle braking system in decelerating and stopping the vehicle can be substantially reduced. This is especially true for low coefficient of friction road surfaces. It has been theorized that the maximum coefficient of friction, and hence the optimum braking efficiency can be achieved when the vehicle wheels, instead of being in a totally locked or nonrotatable condition, are permitted to slip or partially rotate between 10 and 20 percent, with such wheel slip being defined as the ratio of the difference between the velocity of the car ($Vc$) and the braked wheel velocity ($Vw$) with respect to the car velocity ($Vc$), i.e., $Vc - Vw/Vc$.

Generally speaking the present invention relates to a vehicle skid control system which is adapted to function in selectively controlling the vehicle braking system such that the operative characteristics thereof simulate, as closely as possible, the ideal braking pressure at which the vehicle may be decelerated and stopped in the minimum amount of time. Accordingly, it is a general function of the skid control system of the present invention to permit a controlled amount of wheel slippage during braking and to positively prevent locked wheel conditions from occurring upon application of maximum braking pressure by the vehicle operator. The skid control system of the present invention achieves such optimum braking characteristics through the utilization of a novel control or modulating valve assembly which functions to selectively control the flow of hydraulic brake actuating fluid from the master cylinder of the vehicle braking system to the various brake wheel cylinders. The modulating valve assembly utilizes an ancillary source of hydraulic fluid as a means for selectively opening and closing a valve mechanism interposed in the vehicle braking system, with such ancillary source of actuating fluid being communicable to the modulating or control valve in response to an electrical signal transmitted from a control module which receives information concerning the condition of the vehicle wheels.

The modulating valve assembly is characterized by the provision of a novel air spring arrangement which consists of a pressurized air cylinder functioning to normally resist closing movement of the aforesaid valve mechanism, and the provision of a new and improved throttling valve arrangement which is of an extremely simple design, yet functions with extreme effectiveness in assuring proper operation of the modulating valve assembly.

SUMMARY OF THE INVENTION

This invention relates generally to vehicular skid control systems and, more particularly, to a new and improved skid control system incorporating a novel control or modulating valve assembly adapted to be actuated by a source of pressurized hydraulic fluid ancillary to the hydraulic brake actuating fluid system of the associated vehicle.

It is accordingly a general object of the present invention to provide a new and improved vehicular skid control system for controlling the braking system of automotive and similar type vehicles.

It is a more particular object of the present invention to provide a new and improved skid control system which utilizes a source of pressurized fluid ancillary from the source of hydraulic braking fluid as a means for effecting selective actuation thereof. It is yet a more particular object of the present invention to provide a skid control system of the above character which incorporates a novel modulating or control valve actuatable by the source of ancillary fluid in response to an electrical control signal indicating the imminence of a vehicle wheel skid condition.

It is a further object of the present invention to provide a new and improved skid control system of the above character wherein the control or modulating valve thereof is provided with means for assuring proper communication of hydraulic braking fluid from the master cylinder to the vehicle brakes in the event of an unexpected reduction in fluid pressure of the ancillary fluid source.

It is yet a further object of the present invention to provide a modulating or control valve of the above character which features a novel throttling valve.

It is another object of the present invention to provide a skid control system as above described wherein the source of ancillary fluid may be provided by a power steering pump or similar open pump system, as is commonly available on modern automotive and similar type vehicles.

It is still a further object of the present invention to provide a new and improved modulating or control valve of the above described character which utilizes a novel air spring arrangement for resisting movement of a valve member therein toward a position blocking communication through the hydraulic braking system circuit.

Other objects and advantages of the present invention will become apparent from the following detailed description taken in conjunction with the accompanying drawing.

BRIEF DESCRIPTION OF THE DRAWING

FIG. 1 is a schematic diagram of the skid control system embodying the principles of the present invention;

FIG. 2 is a graphical representation of the fluid brake pressure versus time and includes a curve of the electrical control system effecting selective energization of the skid control system of the present invention;

FIG. 3 is an enlarged cross sectional view of the modulating valve assembly incorporated in the skid control system of the present invention, and FIG. 4 is an enlarged fragmentary view of a portion of the structure illustrated in FIGURE 3.

DETAILED DESCRIPTION OF A PREFERRED EMBODIMENT

General description of environment and function

Generally speaking, FIGURE 1 is a schematic diagram of a skid control system, generally designated by the numeral 10, embodying the principles of the present invention and shown in operative association with a vehicular braking system including front and rear brake drums 12 and 14 and associated front and rear brake cylinders 16 and 18, respectively. The skid control system 10 of the present invention, although being adapted to be operatively associated with either pair of front and rear wheel cylinders 16 and 18, or with both pairs thereof, for purposes of simplicity of description of the present invention, the system 10 will be shown and described in operative association only with the rear wheel cylinders 18 of the vehicular braking system shown in FIGURE 1. It will, of course, be also noted that the skid control system 10 of the present invention may be readily utilized in connection with various types of braking systems other than the vehicular braking system shown in FIGURE 1, and may also find particularly useful application in aircraft braking systems of the type well known in the art.

The aforementioned vehicle braking system also comprises a master cylinder assembly 20 which is operable in response to actuation of a conventional foot or brake pedal 22 to communicate hydraulic braking fluid therefrom through fluid conduits or lines 24, 26 and 28 to the front wheel cylinders 16. The rear wheel cylinders 18 are operatively connected by means of a common fluid conduit 30 which is in turn connected through another fluid conduit 32 to the skid control system 10 of the present invention. The master cylinder 20 is also connected to the skid control system 10 through a suitable fluid conduit or line 34, as illustrated in FIGURE 1, and as will hereinafter be described in detail. It will be noted that the vehicle brakes associated with the brake drums 12 and 14 may be of conventional design, the construction and operation of which are well known in the art, and hence the details thereof have been omitted for purposes of simplicity.

The skid control system 10 of the present invention generally comprises a modulating valve assembly 36 that is actuatable in accordance with and in response to an electrical signal produced by an electrical control module 38. The module 38 receives information from suitable means such as sensors 40 associated with each of the brake drums 14, for example, through suitable excitor rings 42. The excitor rings 42 and sensors 40 may be of any construction well known in the art, and since these members constitute no material part of the present invention, the specific details concerning the construction and operation thereof have been omitted. By way of example, the excitor rings 42 may be of a toothed construction, and the sensors 40 may be of a permanent or electromagnetic construction which together define a variable reluctance pickup. During normal operation of the associated vehicle, the excitor rings 42 would be rotated concomitantly with the brake drums 14, and hence simultaneously with the associated vehicle wheels, and by virtue of their toothed construction, the rings 42 would, via the sensors 40, produce electric signals which are transmitted through associated conductors 44 to the control module 38, thus providing a signal to the module 38 responsive to the rotational velocity of the vehicle wheels associated with the brake drums 14.

The control module 38 is designed and constructed to sense the rate of change in the signals received through the conductors 44, and hence to sense the rate of deceleration of the wheels associated with the brake drums 14, and to produce an output signal responsive to the magnitude of the deceleration of the wheels associated with the drums 14 reaching a preselected magnitude corresponding to a skid condition existing or to be occurring at said wheels. The output or control signal is adapted to be transmitted from the control module 38 through a suitable conductor 46 to the modulating valve assembly 36. In the system of the present invention, the control module 38 can provide merely an "on" or "off" signal and modulation of the fluid pressure to the brake cylinders 18 will be provided by the valve assembly 36. It will be noted that in some skid control systems, the fluid pressure to the vehicle brakes is varied in response to an electrical output signal of varying magnitude; however, in the present invention, the fluid pressure is varied or controlled by the valve assembly 36 in response to a signal of substantially constant amplitude which permits the remainder of the system to be considerably simplified.

FIG. 2 illustrates a graphical representation of the relationship between brake pressure and time during a normal braking application. Curve A depicts the relationship of the brake fluid pressure and time wherein the pressure is increased from zero to the maximum fluid pressure available in the system. The brake pressure curve for braking the vehicle at the desired degree or amount of wheel slip, i.e., the relationship shown by the formula $Vc-Vw/Vc$, wherein the maximum coefficient of friction is utilized, is shown as curve B. Braking pressures slightly above the pressures indicated by curve B will result in excessive wheel slip; however, it will be seen that the maximum pressure indicated by the curve B is less than the maximum obtainable pressure of the system (curve A), and hence indicates that relief from the maximum brake pressure is desirable in order to decelerate and stop the associated vehicle in the shortest possible distance. Generally speaking, it is a function of the skid control system 10 of the present invention to provide operational characteristics which, as closely as possible, simulate the ideal pressure curve B. It will be noted, of course, that depending upon the surface conditions of the road over which the associated vehicle is traveling, the ideal curve B will vary somewhat, and hence a family of ideal pressure curves would actually exist for different road conditions. However, for purposes of simplicity of description, only one of such curves has been shown.

In the skid control system 10 of the present invention, the modulating valve assembly 36 will provide for a modulated brake pressure curve C in response to the output signals received from the control module 38. The curve C approximates the ideal pressure curve B and hence provides characteristics for stopping the vehicle in the shortest possible distance. The curve X depicts the output signal Y from the control module 38, and shows the time relation between the signals Y and pressure curve C.

The skid control system 10 of the present invention is adapted to be operatively associated with a source of actuating fluid which is ancillary and preferably entirely independent from the hydraulic braking system of the associated vehicle. The source of such ancillary actuating fluid may be provided by any one of a number of well known "open" fluid pumping systems conventionally associated with automotive and similar type vehicles, such as is commonly utilized in automotive power steering systems.

Open type pumping systems are characterized by the provision of a suitable pump, representatively designated in FIG. 1 by the numeral 48, and a fluid sump or reservoir 49. The pump 48 is adapted to pump actuating fluid through a fluid supply line 50 to the assembly 36, which fluid is returned through a fluid return line 52 to the sump 49. The fluid pumping circuit is completed through conduit or line 53 which communicates the sump 49 with the inlet of the pump 48. Upon actuation of the pump 48, such as, for example, upon energization of the vehicle engine, fluid is pumped through the adjacent circuit at a nominal fluid pressure, however, upon energization of the assembly 36, the aforesaid fluid circuit becomes restricted, whereupon the fluid pressure thereof increases to some preselected level, resulting in actuation of the assembly 36.

Upon deenergization of the assembly 36, the aforesaid fluid circuit is opened or becomes unrestricted which, in turn, reduces the fluid pressure in the system to permit deactuation of the assembly 36, as will hereinafter be described.

In general, the modulating valve assembly 36 comprises a housing 56 defining a hydraulic fluid chamber 58 and having a cylindrical housing 60 mounted on one end thereof. The housing 60 is provided with a slideable hydraulic piston 62 which is mechanically linked to means within the chamber 58 which is actuatable in response to fluid pressure conditions transmitted thereto from the pump 48. The housing 56 is provided with an electrically energized solenoid mechanism 64 that is mechanically linked to a fluid valve mechanism 70 which is movable in response ot actuation of the solenoid mechanism 64 to close or restrict a fluid passage or circuit between the fluid supply conduit 50 and the hydraulic chamber 58.

Generally speaking, when the control module 38 provides an output signal (Y) indicating a skid condition, energization of the solenoid mechanism 64 occurs, resulting in actuation of the valve mechanism 70 in a manner so as to block the flow of hydraulic actuating fluid from the pump 48 to the chamber 58 which results in movement through the aforementioned linkage of the hydraulic piston 62. As the piston 62 moves, the volume within the housing 60 increases, and at the same time a check valve 72 is seated, thereby precluding any further application of the master cylinder brake pressure to the rear brake cylinders 14 and hence to the wheels being skid controlled. The brake cylinder pressure which has already been built up within the cylinder 14 will be relieved by flowing into the increased volume created in the housing 60 by the aforesaid movement of the piston 62. With such relief of the brake cylinder pressure, the associated wheels are free to spin up or increase in speed, until such time as the control module 38 deenergizes the solenoid mechanism 64 (as the Y signal terminates), allowing the valve mechanism 70 to be opened, and resulting in the piston 62 being moved to its original position and the check valve 72 being unseated, whereby the master cylinder pressure will again be applied through the modulating valve assembly 36 directly to the brake cylinders 14.

In operation of the skid control system 10, brake pressure will be increased along the sloped portion of curve A until a skid condition occurs, such as, for example, at point d; this condition will be sensed, as previously described, and the control module 38 will transmit an output control signal Y to actuate the solenoid mechanism 64, whereby the piston 62 will be moved out of the cylinder 60, resulting in a decrease in the brake pressure from point d to point e (FIG. 2). At a point along the curve d to e, the associated vehicle wheels will have had an opportunity to spin up or regain speed, whereby the output signal from the module 38 is terminated, resulting in reactuation of the modulating valve assembly 36 through deenergization of the solenoid mechanism 64. It will be noted that the initial brake pressure at point d was above the ideal pressure curve B, and upon actuation of the valve assembly 36, the brake pressure dropped to a point below the ideal curve B. With the brake pressure above or below the curve B, the maximum coefficient of friction for braking is not achieved, and it is a feature of the present invention that the modulating valve assembly 36 operates in a manner so as to return the fluid pressure as rapidly as possible to a point which is proximate to the ideal curve B, and then to provide for a gradual increase of the fluid pressure along a gradually inclined curve, such as from point f to point g, and since the curve from f to g approximates the shape of the ideal shape curve B, nearly as ideal braking pressure as is possible will be achieved.

Construction and operation of the modulating valve assembly

For purposes of clarity, the terms "inwardly," "outwardly" and derivatives thereof will have reference to the geometric center of the modulating valve assembly 36 of the present invention and the various component parts thereof. Similarly, the terms "forwardly," "rearwardly" and the like will have reference to the assembly, as shown in FIG. 3, with the forward and rearward ends thereof being located at the right and left sides, respectively, of FIG. 3.

Referring now in detail to the construction of the modulating valve assembly 36, and in particular to the cylindrical housing 60 thereof, as best seen in FIG. 3, the housing 60 defines a cylindrical chamber 74 which is adapted to house the aforementioned check valve assembly 72 and a bleeder valve 76 which are similar in construction to the check valve and bleeder valve shown and described in copending United States application Ser. No. 702,095, filed Jan. 31, 1968, and assigned to the assignee of the present application, which copending application is incorporated by reference in the descriptive portion of this application. The cylindrical chamber 74 is coaxially aligned and communicable with a relief chamber 78 within which the hydraulic piston 62 is operatively disposed. A cylindrical bore 80 interconnects the chambers 74 and 78 and is of a reduced diameter relative thereto. The chamber 78 is connected in line with an enlarged bore 82 formed in the end of the housing 56, as will later be described, and an annular sleeve or support bearing 84 is located within the bore 82 and extends partially into an enlarged portion 86 of the relief chamber 78. The bearing 84 defines a central annular opening 88 adapted to support an elongated cylindrical piston rod 89, which is connected in a manner to be described with the piston 62, for longitudinal sliding movement. The piston 62 extends into the relief chamber 78 and is spaced radially inwardly from the periphery thereof. A fluid cup-like seal 90 is disposed adjacent the bearing 84 and aligned axially therewith at the end of the enlarged portion 86 and is adapted to peripherally sealingly engage the piston 62. As will later be described, the housing 60 is communicable with the master cylinder 20 through the fluid conduit 34 that is attached by means of a suitable fluid fitting 94 to the housing 60. The fluid line 32 is connected in fluid communication with the enlarged portion 86 of the chamber 78 through suitable hydraulic fitting means 96, and hence fluid to the brake cylinders 14 must pass from the conduit 34, through the cylindrical chambers 74, 78 and fitting means 96 to the conduit 32.

The check valve assembly 72 is located in the cylindrical chamber 74 and bore 80 and includes a valve body 98 which has an enlarged head portion 100 located in the chamber 74. The valve body 98 has an annular, flexible seal 102 having a radially inwardly extending ring portion 104 which is received in a groove 106 located between the head portion 100 and a reduced diameter flange 108. The flexible seal 102 is generally cup-shaped and overlies the head portion 100, groove 106, flange 108 and the forward surface of the valve body 98. The rearward end of the seal 102 has an annular sealing lip 110 which extends axially beyond the forward end of head portion 100 and provides a sealing action in a manner to be described. The valve body 98 has a rearwardly extending portion 112 which is of reduced diameter and extends through the bore 80 and provides a substantial radial clearance therewith to facilitate the flow of fluid therebetween. An annular ring 114 is supported in an annular groove 116 at the forward end of seal 102 and is in close clearance relation with the wall of the chamber 74. The outer periphery of the ring 114 is notched (see FIG. 4), as seen at 118, to provide for unrestricted fluid flow between opposite sides thereof. Thus, the ring 114 radially pilots the valve body 98 and seal 102 permitting for an enlarged passage between valve body 98 and bore 80. A spring member 120 is in engagement with the ring 114 and is biased to continuously urge the valve body 98 to a closed position. The hydraulic piston 62 is normally held in engagement against an annular shoulder 122 which is defined by the juncture of the bore 80 and the relief chamber 78. The end of the piston 62 has a pair of cross slots 124 (defining chords in the circular end of piston 62) which are in communication with the clearance between bore 80 and rearward portion 112 of the valve body 98. In a normally deactuated condition of the modulating valve 36, with the piston 62 located against the shoulder 122, the spring 120 urges the valve body 98 toward the cylindrical chamber 78 with the rearward portion 112 engaging the end of the piston 62. In this condition, the sealing lip 110 is located in clearance relation with the walls of the chamber 74 and hence communicates the chamber 74 with the chamber 78 via the clearance past bore 80 and cross slots 124. In this condition, normal braking can be effectuated since fluid can freely pass to line 32 to the wheel brake cylinders 14 via the modulating valve assembly 36. Upon the occurrence of a skid condition whereby a skid control output signal is derived from the control module 38, the piston 62 is moved outwardly from the relief chamber 78 and the spring 120 moves the valve body 98 in the same direction, moving the sealing lip 110 into engagement with a shoulder 126 of the chamber 74 to substantially seal the chamber 74 from the chamber 78. At this point fluid from the master cylinder 20 to conduit 32 is generally cut off.

As previously noted, the bleed valve assembly 76 is located in the chamber 74 and is also actuated by the piston 62 and hence upon sufficient movement of piston 62 out of chamber 78, the bleed valve assembly 76 will also be closed. The assembly 76 includes an elongated stem 128 which extends through a bore 130 in valve body 98 and is in close clearance therewith. One end of the elongated stem 128 is located against the end of the piston 62 when the valve assembly 76 is in its normally deactuated position, as shown in FIG. 4. The opposite end of the elongated stem 128 is connected to a cap 132 which is engaged by a spring 134 that urges the cap 132 and stem 128 in a direction toward the chamber 78 to a closed position. The elongated stem 128 has an annular sealing surface 136 which is engageable with an annular forwardly facing sealing hose 138 in the seal 102 to close the clearance passage between the bore 130 and stem 128. In its actuated, closed position the stem 128 extends substantially beyond the rearward portion 112 of the valve body 98 such that on the return of piston 62, the bleed valve assembly 76 will be opened before the check valve assembly 72; this serves a purpose to be later described. Since actuation of the piston 62 is rapid, closing of the main passage through the check valve assembly 72 and the closing of the secondary restricted passage through the bleed valve assembly 76 occur in relatively rapid succession. The seal 102 has a radially inner surface 140 which engages the stem 128, and the surface 140 is "scalloped" to permit the flow of fluid for the bleed valve function. It will be noted that the seal 102 provides a sealing function for the check valve 72 and also for the bleed valve 76.

As the hydraulic piston 62 is withdrawn from the chamber 78, the volume thereof is increased, whereby the fluid pressure in the chamber 78 will be relieved. Relief of the fluid pressure will cause a decrease in the braking effectiveness of the associated wheels, thereby permitting the wheels to spin-up or to regain speed.

The housing section 56 is formed with an outwardly extending flared section 142 which terminates at its outer end in an generally longitudinally extending flange section 144. Disposed within the flange section 144 is one end of a generally cup-shaped enclosure 146 having a side wall section 148 and an end wall section 150 cooperable with the side wall section 148 to define a pressure chamber, generally designated 152. The forward end of the side wall section 148 is formed with a reverse bend portion 154 which is received interiorly of the flange section 144 of the housing 56 and is fixedly secured therein by means of a retaining ring 156 that is received in part within a groove 158 extending around the inner side of the flange section 144.

The interior of the pressure chamber 152 is communicable through a suitable fitting 160 mounted in an opening 162 in the enclosure section 150. The fitting 160 is adapted to operatively secure one end of a pressure line or conduit 164 to the enclosure 146, which conduit 164 is adapted to be communicable with a source of pressurized air which may be provided by any suitable means such as, for example, a suitable air compressor or the like representatively designated in FIG. 1 by the numeral 166. The chamber 152 is adapted to be charged with air at a predetermined pressure (approximately 150 p.s.i.), and whenever the pressure in the chamber 152 drops below this level, the compressor or the like will function to raise the pressure level to said predetermined level. In a preferred construction of the modulating valve assembly 36, a check valve (not shown) is provided, for example, in the fitting 160, to control the flow of pressurized air from the compressor 166 to the interior of the chamber 152. Such a check valve may be of any suitable type well known in the art.

Disposed within the interior of the chamber 58 is a flexible diaphragm, generally designated 168, the outer periphery of which is provided with an enlarged thickness section 170 that is clampingly received between the interior side of the clamp section 144 and the exterior side of the reverse bend portion 154 of the enclosure 146. It will be seen that the diaphragm section 170 serves as a gasket or sealing means to provide a fluid tight seal around the juncture of the housing 56 and enclosure 146. From the section 170, the diaphragm 168 extends inwardly and then longitudinally forwardly to a position adjacent the rearward end of the cylindrical piston rod 89. As best illustrated in FIG. 3, the rearward end of the piston rod 89 is formed with a reduced diameter, externally threaded end portion 172 defining an annular shoulder 174. Disposed circumjacent the rearward end of the piston rod 89 is a generally cup-shaped member 176 having an annular side wall section 178 extending around and arranged coaxially of the rod 89. The rearward end of the section 178 terminates in a radially inwardly extending end section 180 which defines a central annular opening 182 through which the end section 172 of the piston rod 89 extends. The radially innermost portion of the diaphragm 168 is clampingly secured against the rearward face of the end section 180 by means of annular retaining or clamping plate 184 and a suitable nut 186, the latter of which is threadably received upon the end section 172. It will be seen that the nut 186 is tightened to a position wherein the retaining plate 184 biases the member 176 into positive engagement with, and assures a fluid tight seal between, the confronting surfaces of the plate 184, member 176 and the opposite sides of the diaphragm 168. Thus, it will be seen that the diaphragm 168 is operatively secured to the rearward end of the piston rod 89, whereby longitudinal rearward movement of the rod 89 will effect displacement of the diaphragm 168 from the position shown in FIG. 3 to a position wherein the diaphragm 168 is disposed at least in part within the forward end of the enclosure 146, as will later be described.

Disposed forwardly of the end of member 176 is a throttling valve assembly 188 which comprises a generally disk-shaped valve member 190 that defines a central annular opening 192 through which an intermediate portion of the piston rod 89 extends. The valve member 190 is adapted to engage an annular shoulder or valve seat 194 which is formed around the interior of the chamber 58 and lies along a plane perpendicular to the longitudinal axis of the piston rod 89. The valve member 190 is adapted to be resiliently urged into sealing engagement with the valve seat 194 by means of a helical coil spring or the like 196 which is arranged circumjacent the piston rod 89. The rearward end of the spring 196 bears against the forward side of the end section 180 of the member 176, while the forward end of the spring 196 bears directly against the rearward side of the valve member 190. Movement of the valve member 190 toward sealing engagement with the valve seat 194 is resisted by another helical coil spring 198 which is somewhat less resilient than the spring 196 and is disposed circumjacent the piston rod 89 directly forwardly of the valve member 190. The rearward end of the spring 189 bears against the forward side of the valve member 190, while the forward end of the spring 198 bears against an annular spring retainer member 200 which is received within an annular groove or recess 202 defined by an annular cup-like seal 204 disposed on the rearward end of the support bearing 84 and providing a fluid tight seal around the periphery of the piston rod 89. It will be noted that the diameter of the annular opening 192 is slightly greater than the outside diameter of the piston rod 89 with the result that an annular opening is provided therebetween. This opening provides a restricted orifice through which fluid may flow to control movement of the valve member 190 toward engagement with the valve seat 194. The piston rod 89 is provided with an annular recess 206 directly rearwardly of the seal 204, which recess 206 carries a snap ring or the like 208 which is adapted to engage the forward side of the valve member 190 and move the member 190 toward the left in FIG. 3 upon rearward movement of the piston rod 89, with the result that such rearward movement of the rod 89 effects opening of the throttling valve assembly 188, as will be described in connection with the overall operation of the system 10.

The forward end of the piston rod 89 is formed with a reduced diameter end section 210 which is adapted to be telescopically received within a rearwardly extending bore 212 formed in the rearward end of the housing 62, whereby the piston rod 89 is free to move rearwardly of the housing 56 independently of the piston 62; however, it will be seen that end section 210 defines an annular shoulder 214 which is engaged with the rearward end of the piston 62 so that forward movement of the piston rod 89 will effect simultaneous forward movement of the piston 62, as will later be described.

Briefly, in operation of the modulating valve assembly 36, the chamber 152 is pressurized at a predetermined level, approximately 150 p.s.i., with the result that this pressure forces the diaphragm 168 and piston rod 89, as well as the piston 62 to the various positions shown in FIG. 3. At such time as a skid control signal (Y) is received from the module 38, fluid which is communicated into the chamber 58 from the inlet line 52 in a manner hereinafter to be described becomes pressurized, and when this fluid pressure exceeds the pressure of the air within the chamber 152, i.e., exceeds 150 p.s.i., the fluid forces the diaphragm 168 toward the left, with the result that the piston rod 89 will similarly move toward the left until such time as the rearward end of the retaining plate 184 engages the forward side of an interiorly projecting stop member 216 provided within the enclosure 146. As the piston rod 89 moves toward the left, the snap ring 208 engages the forward side of the valve member 190 to effect disengagement thereof from the valve seat 194. Upon termination of the skid control signal from the module 38 the pressure of the fluid within the chamber 58 will decrease to a level below the pressure of the compressed air within the chamber 152, with the result that the air pressure will again cause the diaphragm 168 and piston rod 89 to be moved toward the right into the solid line position shown in FIG. 3. As will later be described, the aforesaid forward and rearward longitudinal movement of the piston rod 89 will effect a corresponding longitudinal movement of the piston 62 to effect selective actuation and deactuation of the check valve assembly 72 and bleed valve assembly 76, and thus control the opening and closing of the hydraulic circuit from the master cylinder 20 to the rear wheel cylinders 18.

The housing 56 is formed with a downwardly extending section 218 within which a downwardly and rearwardly inclined valve bore, generally designated 220, is formed. The bore 220 is formed with an enlarged diameter intermediate section 222 and is adapted to support a spool valve member, generally designated 224, for longitudinal sliding movement, as will be described. The housing section 218 defines a generally flat or planar surface 226 on the rearward side thereof upon which the solenoid mechanism 64 is fixedly mounted.

The solenoid mechanism 64 comprises a generally cup-shaped enclosure 228 which has an outturned flange section 230 at one end thereof that is fixedly secured by any suitable means to the surface 226. Disposed within the enclosure 228 is a plurality of solenoid windings 232 and a movable armature assembly, generally designated 234. The assembly 234 is connected through a plunger 238 to the rearward end of the spool valve 224, and upon energization of the windings 232, the assembly 234 is adapted to move forwardly, with the result that the plunger 238 and spool valve 224 will similarly move in a forward direction. Interposed between the spool valve 224 and the solenoid mechanism 64 is a partition member 240 which is mounted in the rearward end of the valve bore 220 and is provided with a central bore or passage 242 through which the plunger 238 extends. The bore 242 is formed with a counterbore 244 within which a suitable cuplike or similar fluid seal is mounted to provide a fluid tight seal around the periphery of the plunger 238. Movement of the spool assembly 224 toward the right in FIG. 3 is resiliently resisted by a helical coil spring 248 which bears at one end thereof against the end of the bore 220, at the opposite end against the forward end of the valve 224. The spring 248 functions to resiliently bias the valve 224, plunger 238 and armature assembly 234 to the positions shown in FIG. 3 upon deenergization of the solenoid mechanism 64, as will be apparent.

The valve bore 220 is connected through a generally vertically extending bore 250 with the interior of the chamber 58, which bore 250 communicates with the valve bore 220 at a position aligned with the enlarged diameter section 222 thereof. The bore section 222 is also communicable through a downwardly extending bore 252 and counterbore 254 with the inlet line or conduit 50 which is fixedly secured within the counterbore 254 by suitable fluid fitting means 256. The bore 250 is communicable through a generally horizontally arranged passage 258 with a check valve bore 260, the outer end of which is closed by a suitable closure plug 262 and O-ring sealing means 264. The check valve bore 260 defines annular shoulder or valve seat 266 at the end thereof adjacent the passage 258 and against which a spherical check valve member 268 is adapted to be resiliently engaged by means of a suitable helical coil spring 270. The check valve bore 260 is communicable through a downwardly extending passage 272 with the valve bore 220, and the valve bore 220 is also communicable through a downwardly extending passage 274 and counterbore 276 with the outlet line 50 which is secured within the counterbore 276 by means of a suitable fluid fitting means 278.

During normal operation of the pump 48, actuating fluid is pumped through the inlet line 50 to the interior of the valve bore 220, and through the valve 250 to the interior of the chamber 58. Due to the fact that the flow of fluid to the chamber 58 is unrestricted, and the fact that the pump is of the "open" type, the pressure of the fluid will be nominal; however, at such time as the solenoid mechanism 64 is actuated, the spool valve 224 will move forwardly or toward the right in FIG. 3 to a position out of registry with the enlarged diameter section 222 of the valve bore 220. When this occurs, the flow of fluid through the valve bore 220 will become somewhat restricted, resulting in the pressure of the fluid increasing. As long as the mechanism 64 remains actuated, the pressure will increase until such time as it overcomes the air pressure of the chamber 152, which results in actuation of the piston rod 89, as above described. In the event the pressure of the fluid passing from the inlet line 50 to the chamber 58 exceeds the pressure in the chamber 152 by some preselected amount, the check valve 268 will be open against the resistance of the spring 270, whereby the fluid within the bore 250 may flow through the passage 258, check valve bore 260, bore 272 and passage 274 into the fluid return line 52. Thus, the check valve 268 acts as a safety means to assure that the fluid pressure within the system does not exceed a level at which the system may be damaged. At such time as the solenoid mechanism 64 is deactuated, the spool valve 224 will move rearwardly or toward the left in FIG. 3 into registry with the enlarged diameter section 222 of the valve bore 220, which results in removing the restriction to fluid passing through the valve bore 222, thus reducing the pressure of the fluid to permit deactuation of the piston rod 89.

Operation of the entire system

In operation of the skid control system 10 of the present invention, assuming the initial conditions that the associated vehicle is operating, and that the pump 48 is functioning to supply fluid at a nominal pressure through the supply line 50 and to the housing 56 of the modulating valve assembly 36, and that the pressurized air source or compressor 166 is maintaining a preselected charge of air within the chamber 152, the various component parts of the modulating valve assembly 36 are as is shown in FIG. 3. At such time as the vehicle brakes are applied under conditions wherein a wheel skid becomes imminent, the control module 38 will transmit a control signal (Signal Y) through the conductor 46 to the modulating valve assembly 36. Receipt of this signal by the assembly 36 results in actuation or energization of the solenoid mechanism 64, which causes the spool valve 224 to be moved out of registry with the enlarged diameter section 222 of the valve bore 220 so that the fluid pumped into the chamber 58 will increase in pressure. When the pressure within the chamber 58 increases so that it overcomes the pressure within the chamber 152, the piston rod 89 and diaphragm 168 will be biased rearwardly or toward the left in FIG. 3 until the retaining plate 184 engages the member 216. As the piston rod 89 moves rearwardly, the snap ring 208 engages the forward side of the valve member 190 and biases the same rearwardly out of engagement with the valve seat 194. When this occurs, the existing brake fluid pressure within the chamber 78 will cause the piston 62 to move toward the left or rearwardly in FIG. 3, with the result that the volume within the housing 60 will increase to relieve the fluid pressure transmitted to the rear wheel cylinders 18, thereby permitting the rear wheels of the vehicle to spin up. Simultaneously, the check valve 72 will be closed, thereby precluding any further application of master cylinder brake pressure to the wheel cylinder 18.

At such time as the rear wheels of the vehicle have had an opportunity to spin up or rotate to a preselected speed, the control signal (Y) from the module 38 to the modulating valve assembly 36 will be terminated, at which time the solenoid mechanism 64 will be deactuated, resulting in the spool valve 224 moving rearwardly into registry with the enlarged diameter section 222 of the valve bore 220 to relieve the fluid pressure within the chamber 58. When the pressure within the chamber 58 drops below the pressure in the chamber 152, the diaphragm 168 and piston rod 89 will move forwardly or toward the right in FIG. 3, thereby biasing the piston 62 toward the right in the chamber 78, causing pressure to be reapplied to the rear wheel cylinders 18. This procedure will occur very rapidly. As the piston rod 89 moves toward the right, the volume of fluid on the rearward side of the valve 190 will be permitted to flow around the periphery of the member 190 to the forward side thereof until such time as the valve member 190 moves into sealing engagement with the valve seat 194. Thereafter the fluid on the rearward side of the member 190 must escape through the annulus defined between the periphery of the opening 192 and the outer periphery of the piston rod 89 which offers substantial restriction to the flow of such fluid. This restriction results in a throttling effect or slowing down of movement of the piston rod 89, and hence hydraulic piston 62, toward the right in FIG. 3, which, in turn, results in the brake pressure being reapplied at a reduced rate. This throttling action will continue until such time as the hydraulic piston 62 has traveled to the position shown in FIG 3, or until a subsequent output signal is received from the control module 38.

Depending upon the conditions of the road and the fluid requirements of the brake system (due to fade, etc.) the ideal required pressure may change and it is desirable that actual applied pressure change accordingly. The bleed valve assembly 76 aids in this regard. As the piston 62 is moved back to its original position upon deactuation of the solenoid mechanism 64, it engages the stem 128 of the bleed valve assembly 76 prior to engagement with the portion 112 of the check valve body 98. When this occurs, fluid from the master cylinder 20 to the fluid line 32 will gradually be applied to the wheel cylinders 18 through the restricted path defined by the slight clearance between the bore 130 and the stem 128. This will permit a gradual or controlled increase in the brake pressure from the point $g$ to the point $h$ (FIG. 2) and result in curve C closely following curve B even when an increase in brake pressure or more fluid is required by the system. If the bleed valve 76 were not utilized and if additional pressure were required by the system before the occurrence of another skid condition, then when the piston 62 opened the check valve 72 a sharp or uncontrolled increase in pressure from point $g$ to point $k$ would occur, resulting in a substantial departure from the ideal curve B. The pressure differentials between point $d$ and point $e$ and point $d$ and point $f$ are substantially fixed, since for each actuation of the valve assembly 36, the piston 62 is moved the same maximum distance out of the cylinder 78. The point $g$, however, is not fixed and can change in magnitude depending on the existing conditions. Thus by reaching the point $k$, the entire curve C would be raised (since the differentials $d$ to $e$ and $e$ to $f$ are fixed) and the excursions of that curve would be farther from the ideal curve B. Accordingly, by use of the bleed valve assembly 76 in combination with the check valve 72, the modulating valve assembly 36 will provide a brake pressure curve C closely approximating the ideal brake pressure. In order to closely approximate the curve B the time from point $d$ to point $e$ is held to a minimum and the time from point $e$ to point $f$ is also held to a minimum; however, the time from point $f$ to point $g$ is made substantially longer since that part of the operational cycle (point $d$ to point $g$) closely follows the curve B. Thus over the total elapsed time of the operational cycle ($d$ to $g$) a good portion of the time is at pressures close to the ideal.

The purpose of the telescopic interengagement between the piston rod 89 and hydraulic piston 62 is, in general, to prevent any air from being drawn into the hydraulic brake circuit. More particularly, it will be seen that when the pressure increases in the chamber 58 at a very rapid rate, the piston rod 89 will be rapidly biased toward the left or rearwardly in FIG. 3. In the event the pressure of the brake system is insufficient to cause the piston 62 to be biased toward the left at the same speed and simultaneously with the piston rod 89, the piston rod 89 is permitted to move rearwardly at a relatively faster rate than the piston 62, due to the telescopic relationship between the piston rod 89 and piston 62, and the piston 62 is free to move rearwardly independently of the piston rod 89 and at a rate commensurate with the pressure in the hydraulic brake system. If the piston 62 were made to move rearwardly at the same rate as the piston rod 89 under conditions wherein the pressure of the hydraulic brake fluid circuit was below a preselected level, a vacuum would be created in the brake circuit which would introduce undesirable atmospheric air therein, a condition which is highly undesirable in vehicle brake systems, as is well known in the art.

It will be seen from the foregoing description that the present invention provides a new and improved skid control system which is characterized by a number of features which will be found to be superior when compared to related apparatus known in the prior art. In particular, the modulating valve assembly 36 features a new and improved pressurized air chamber for effecting actuation of the piston rod 89, which piston rod 89 is connected in the manner above described to the hydraulic piston 62 so as to assure against inadvertent atmospheric air being introduced into the associated brake system. Moreover, the modulating valve assembly 36 is characterized by the provision of a new and improved throttling valve assembly 188 which will be found to be of an extremely simple design, yet positive in action so as to minimize assembly time and attendant manufacturing expense.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

I claim:
1. In a skid control system for controlling the fluid pressure applied to the brakes of at least one wheel of a wheeled vehicle from a source of brake actuating fluid,
a modulating valve assembly comprising,
pressure control means including piston means movable between actuated and deactuated positions for controlling the magnitude of the pressure of the brake actuating fluid supplied to the brakes,
actuating means including a source of pressurized fluid ancillary to the source of brake actuating fluid for selectively moving said piston means,
means including a source of pressurized gas for controlling movement of said actuating means, and
valve means for controlling application of said ancillary fluid and means responsive to an electrical control signal effecting operation of said valve means.

2. The invention as set forth in claim 1 wherein said means for controlling movement of said actuating means includes a source of pressurized air.

3. The invention as set forth in claim 2 wherein said actuating means includes piston rod means for moving piston means under the influence of said source of pressurized air.

4. The invention as set forth in claim 3 wherein said source of pressurized air comprises an air chamber, and which includes diaphragm means operatively associated with said piston rod means for moving said piston rod means when the air pressure in said chamber exceeds the pressure of said ancillary fluid.

5. The invention as set forth in claim 3 wherein said source of pressurized air acts to bias said piston means toward said deactuated position and said source of ancillary fluid acts to bias said piston means toward said actuated position.

6. The invention as set forth in claim 3 wherein said pressure control means includes check valve means for blocking fluid pressure from said source of brake actuating fluid.

7. The invention as set forth in claim 6 wherein said piston rod means is movable in response to differential pressure conditions between said ancillary fluid and said source of pressurized air toward and away from positions actuating and deactuating said check valve means.

8. The invention as set forth in claim 2 which includes means defining a first chamber communicable with said source of ancillary fluid and a second chamber communicable with said source of pressurized air, which includes diaphragm means disposed between said first and second chambers and movable in response to differential pressure conditions therebetween, and which includes piston rod means for moving said piston means in response to movement of said diaphragm means.

9. The invention as set forth in claim 8 wherein said ancillary source of fluid includes an open hydraulic system, and wherein said valve means is movable between actuated and deactuated positions to increase and decrease the pressure of said system.

10. The invention as set forth in claim 9 wherein said hydraulic system includes fluid inlet and outlet passages communicating said ancillary fluid to and from the modulating valve assembly, and which includes check valve means for relieving the pressure of said ancillary fluid supplied by said inlet passage to said first chamber.

11. The invention as set forth in claim 8 which includes control means providing an output signal in response to the existence of a skid condition at the one wheel, and which includes means responsive to the control signal for actuating said valve means.

12. In a skid control system for controlling the fluid pressure applied to the brakes of at least one wheel of a wheeled vehicle from a source of brake actuating fluid,
a modulating valve assembly comprising,
pressure control means including piston means movable between actuated and deactuated positions for controlling the magnitude of the pressure of the brake actuating fluid supplied to the brakes,
actuating means including a source of pressurized fluid ancillary to the source of brake actuating fluid for selectively moving said piston means,
means including a source of pressurized gas for controlling movement of said actuating means,
said pressure control means having a first condition for relieving the fluid pressure to the brakes, a second condition not relieving the fluid pressure to the brakes, and intermediate conditions in which fluid pressure is reapplied to the brakes,
said actuating means being actuatable in response to a control signal for rapidly placing said pressure control means in a first condition and for rapidly placing said pressure control means in one of said intermediate conditions and gradually operating said pressure control means toward said first condition, and
valve means for controlling application of said ancillary fluid and means responsive to an electrical control signal effecting operation of said valve means.

13. In a skid control system for controlling the fluid pressure applied to the brakes of at least one wheel of a wheeled vehicle from a source of brake actuating fluid,
a modulating valve assembly comprising,
pressure control means including piston means movable between actuated and deactuated positions for controlling the magnitude of the pressure of the brake actuating fluid supplied to the brakes,
actuating means including a source of pressurized fluid ancillary to the source of brake actuating fluid for selectively moving said piston means,
means including a source of pressurized gas for controlling movement of said actuating means,
said pressure control means having a first condition for relieving the fluid pressure to the brakes, a second condition not relieving the fluid pressure to the brakes, and intermediate conditions in which fluid pressure is reapplied to the brakes,
said actuating means being actuatable in response to a control signal for rapidly placing said pressure control means in a first condition and for rapidly placing said pressure control means in one of said intermediate conditions and gradually operating said pressure control means toward said first condition, piston rod means for moving said piston means under the influence of said source of pressurized air, and throttling valve means for controlling movement of said piston rod means.

14. The invention as set forth in claim 13 wherein said throttling valve means comprises a generally disk-shaped valve member, said member defining a restricted throttling orifice and an opening through which said piston rod extends.

15. The invention as set forth in claim 14 which includes means defining a first chamber communicable with said source of ancillary fluid and a second chamber communicable with said source of pressurized air, which includes diaphragm means disposed between said first and second chambers, which includes a valve seat engageable with said valve member, wherein said piston rod means is movable in response to a differential pressure condition between said first and second chambers for moving said valve member out of engagement with said valve seat.

16. The invention as set forth in claim 15 wherein said piston rod means is operable to bias said valve member out of engagement with said valve seat when the pressure in said first chamber exceeds the pressure in said second chamber.

17. The invention as set forth in claim 15 which includes spring means normally resiliently urging said valve member toward said valve seat.

18. The invention as set forth in claim 14 wherein said restricted throttling orifice is provided by an annular opening defined between the outer periphery of said piston rod means and the inner periphery of said opening of said valve member.

19. In a skid control system for controlling the fluid pressure applied to the brakes of at least one wheel of a wheeled vehicle from a source of brake actuating fluid, a modulating valve assembly comprising,
pressure control means including piston means movable between actuated and deactuated positions for controlling the magnitude of the pressure of the brake actuating fluid supplied to the brakes,
actuating means including a source of pressurized fluid ancillary to the source of brake actuating fluid for selectively moving said piston means,
piston rod means for moving said piston means under the influence of a source of pressurized gas,
means operatively connecting said piston and piston rod means whereby to permit independent movement therebetween, and
throttling valve means for controlling actuation of said piston rod means.

20. The invention as set forth in claim 19 wherein said piston rod means is movable between first and second positions, wherein said piston means and said piston rod means are independently slidably disposed in said valve assembly whereby said piston means is movable from said deactuated position toward said actuated position independent of movement of said piston rod means from said first position toward said second position.

21. The invention as set forth in claim 20 wherein said piston rod means is telescopically engaged with said piston means.

22. The invention as set forth in claim 21 wherein said piston rod means comprises a generally cylindrically shaped end portion and wherein said piston comprises a cylindrical bore adapted to removably receive said end portion.

23. The invention as set forth in claim 20 wherein said piston means is movable from said deactuated position toward said actuated position under the influence of pressure of the brake actuating fluid.

References Cited
UNITED STATES PATENTS

| | | | |
|---|---|---|---|
| 2,975,003 | 3/1961 | Sandor | 303—21 |
| 3,269,781 | 8/1966 | Van House | 303—21 |
| 3,306,677 | 2/1967 | Dewar et al. | 303—21 |
| 3,322,471 | 5/1967 | Faiver et al. | 303—21 |
| 3,401,987 | 9/1968 | Horvath | 303—21 |

MILTON BUCHLER, Primary Examiner

J. J. McLAUGHLIN, Jr., Assistant Examiner

U.S. Cl. X.R.

303—10, 69